Figure 5:
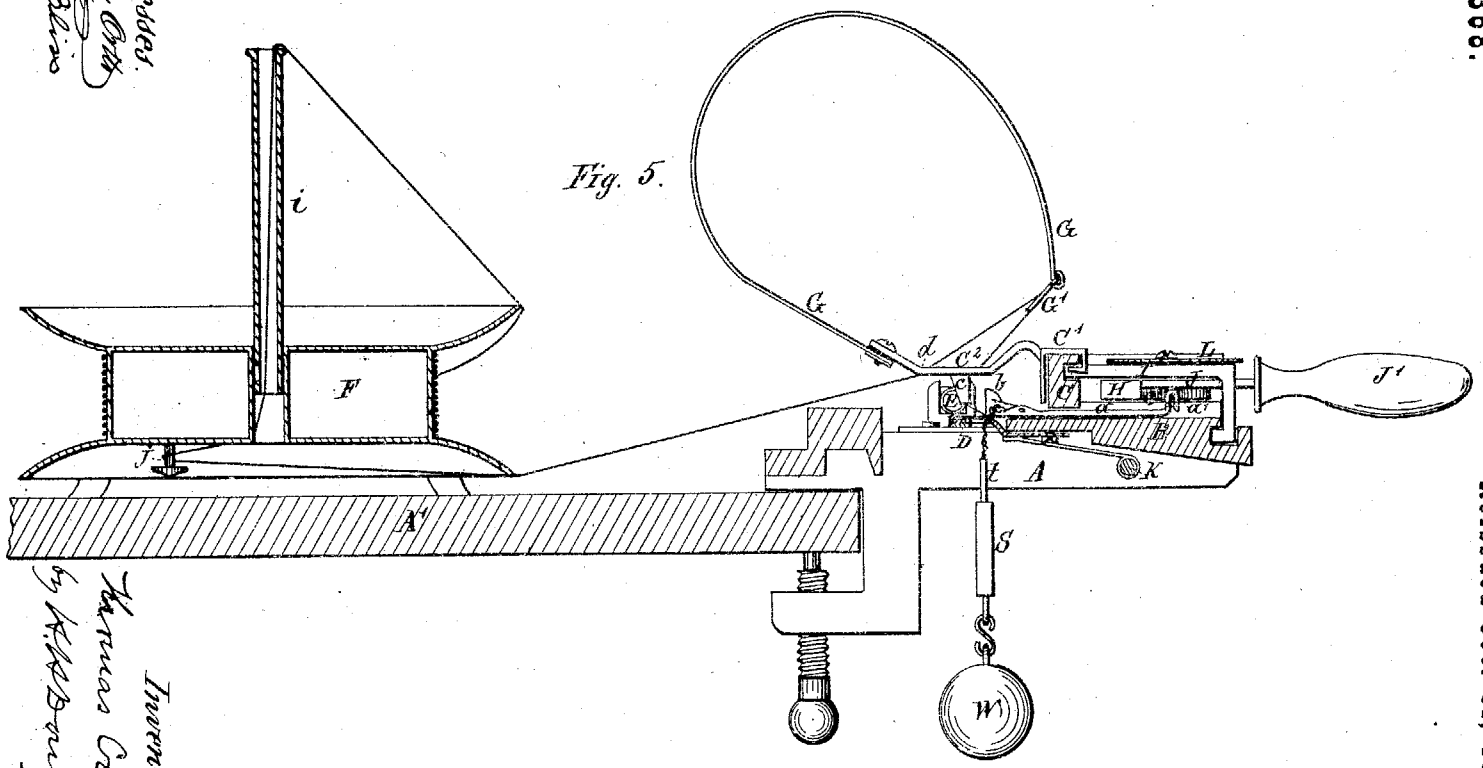

2 Sheets—Sheet 1.
T. CRANE.
KNITTING-MACHINES.
No. 7,368. Reissued Oct. 31. 1876.
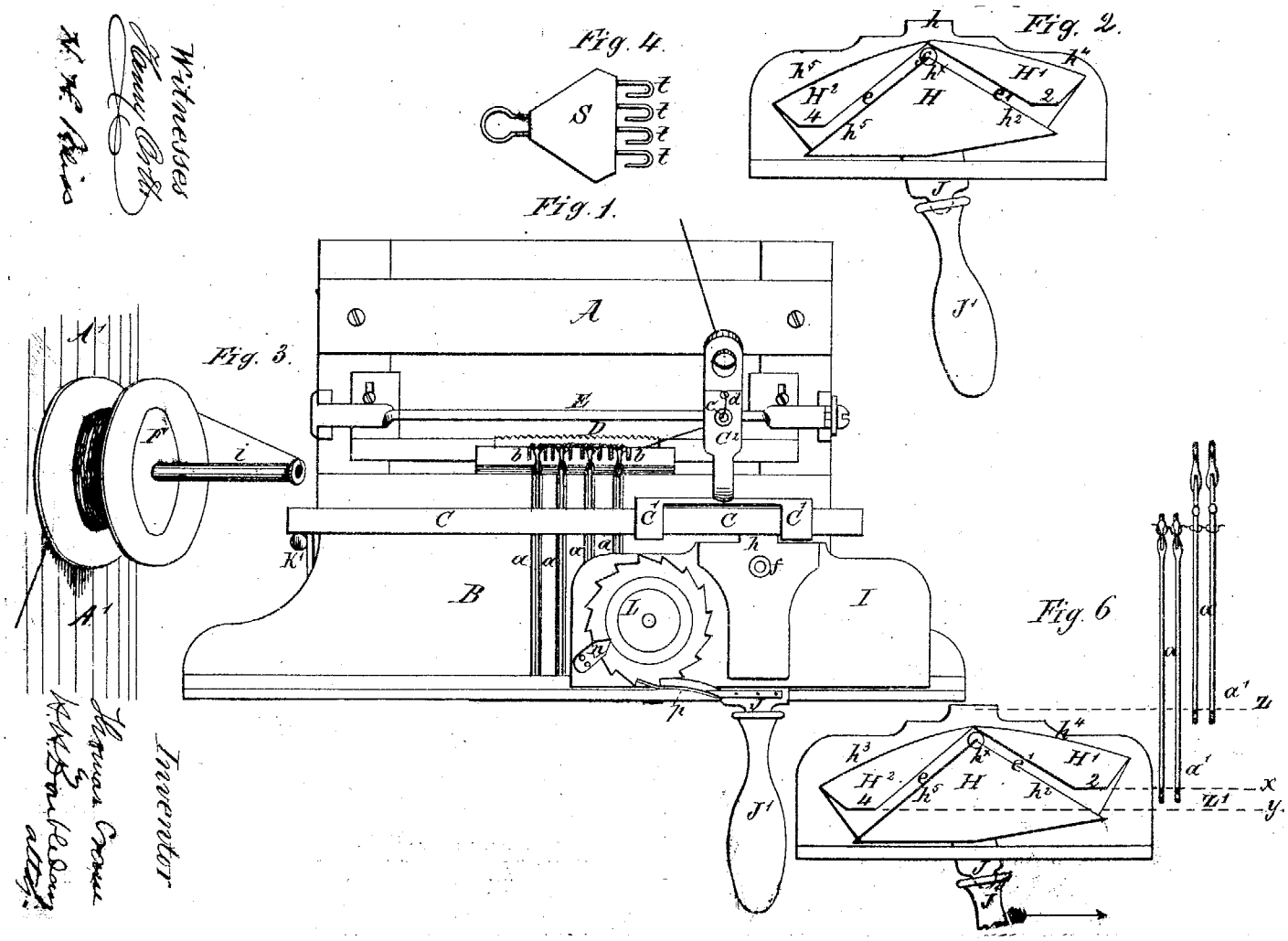
Witnesses
Henry Orth
W. H. Bliss
Inventor
Thomas Crane
by
H. H. Bowlby
atty.

2 Sheets—Sheet 2.

T. CRANE.

KNITTING-MACHINES.

No. 7,368. Reissued Oct. 31, 1876.

Witnesses.
Henry Orth
H. H. Bliss

Inventor
Thomas Crane
by H. A. Doubleday
atty

UNITED STATES PATENT OFFICE.

THOMAS CRANE, OF FORT ATKINSON, WISCONSIN, ASSIGNOR, BY MESNE ASSIGNMENTS, TO THE FRANZ AND POPE KNITTING MACHINE COMPANY, OF BUCYRUS, OHIO.

IMPROVEMENT IN KNITTING-MACHINES.

Specification forming part of Letters Patent No. 73,697, dated January 28, 1868; reissue No. 7,368, dated October 31, 1876; application filed September 9, 1876.

*To all whom it may concern:*

Be it known that I, THOMAS CRANE, of Fort Atkinson, in the county of Jefferson and State of Wisconsin, have invented certain new and useful Improvements in Knitting Machinery; and I do hereby declare that the following is a full, clear, and exact description thereof, reference being had to the accompanying drawings, making a part of this specification, in which—

Figure 1 is a plan view of the improved knitting-machine arranged with four needles to show the operation thereof. Fig. 2 is a bottom view of the oscillating cam, its slide, and vibrating arm or handle. Fig. 3 is a perspective view of the spool around which the yarn is wound. Fig. 4 is a view of the hooked device for setting up the work. Fig. 5 is a longitudinal section, taken in a vertical plane through the machine complete. Fig. 6 is a detached view of the cams and needles.

Similar letters of reference indicate corresponding parts in the several figures.

In knitting-machines as heretofore constructed it has been customary, when it was desired to throw a portion of the needles out of action, to remove the stitches from such needles, and then either remove these needles from the machine or press them so far into the grooves in which they were supported that their shanks or heels could not be acted upon by the cams; thus these needles remained temporarily inactive, and when they were again brought into action stitches had to be placed upon them.

There were many objections to that method of operation, and to remedy this defect, among others, I made this invention, one part of which consists in providing the machine with an unobstructed space between the cams and the work-support, or the rib or flange which limits the movement of the shank of the needles as they are being moved upward or forward, into which space the shanks of the needles can be moved without taking off their respective stitches, the result being that while in this position the cams pass the needles without actuating them; and, further, in using in connection with such unobstructed space, oscillating, vibrating, or pivoted cams, by means of which such needles as have been temporarily withdrawn from action, are, when again brought into action, caused to pursue a path, when first engaged by the cams, which is different from the path which such needles would have pursued if the machine had been constructed with cams which were rigidly attached to the cam-carrier.

The invention also provides for the use of an adjustable jack-frame, which will admit of knitting as tight or as loose as may be desired, and also for the use of an adjustable work-holder, which is attached to the same adjusting device used for moving the jacks, as will be hereinafter described. The invention also provides a novel device for setting up the work at the commencement of the operation of knitting. The invention also provides for the use of a spool for holding the yarn, and allowing it to be fed up as the work progresses. The invention also provides for the use of a spool for holding the yarn, and allowing it to be fed up as the work progresses. The invention also provides for taking up the slack yarn as the yarn-carrier moves toward the center of the work by means of a tension-spring or other suitable device applied to and moved with the said yarn-carrier, and acting continuously upon the yarn, so as to keep it under proper tension to insure good work, as will be hereinafter described.

To enable others skilled in the art to understand my invention, I will now proceed to describe its construction and operation.

In the accompanying drawings, A represents the frame of the machine, which is provided with clamping screws and jaws, by means of which the machine can be secured fast to the edge of a table, A′, or other established object. B represents the needle-bed, which is constructed with parallel grooves running transversely across its face, for the purpose of receiving and guiding the needles *a a*, only four of which are shown. These needles may be constructed like the ordinary knitting-needles hitherto used for machine-knitting with pivoted latches for casting off, and with right-angular shanks or heels $a'$, as shown in Figs. 1 and 5. These needles $a$ pass under a longitudinal way, C, to which is attached the slide C′ carrying the yarn-distributer and tension device, as will be hereinafter described. The needles $a$ also pass between the jacks $b$ $b$, over the work-holding plate D, and beneath an inclined blade or latch-opener, E. (Shown in Fig. 1.)

The slide $C^1$ is constructed so as to embrace and be held in place upon the way C, and to the front portion of this slide an arm, $C^2$, projects outward and extends over the jacks, the work-holding plate, and also over the latch-opener, as shown in Fig. 5. Between the latch-opener E and the jacks $b$ $b$ a tube, $c$, projects from the arm $C^2$ and extends nearly down to the plate D, leaving sufficient space beneath its lower end to allow the needles to play freely. This tube is designed for distributing the yarn upon the needles during its passage back and forth over them, so that the hooks on the needles will, with certainty, take the yard thus laid upon them.

The yarn is taken from a spool, F, (shown in Figs. 3 and 5, and which will be hereinafter described,) and passed upward through a hole, $d$, made through the arm $C^2$, thence down through the distributing-tube $c$ to the work. Between the tube $c$ and the eye $d$ the yarn is held under tension by a spring, G, (shown in Fig. 5,) one end of which is secured fast to the arm $C^2$, and the other end is bent over and provided with an eye or hook, G′, through which the yarn passes, as shown. This take-up spring G will keep the loop of yarn between the distributer and the eye $d$ under constant tension, and it will take up the slack as the yarn-carrier moves toward the center of the work from either side of the machine.

The needles are moved toward and from the work by means of what I shall denominate an oscillating cam, or cams, which I have shown in Figs. 2 and 5. This cam-plate is constructed with oblique grooves in its bottom side, terminating in flaring recesses. The grooves $e$ $e'$ are designed for receiving in them the right-angular shanks or heels $a^1$ of the needles, so that at every stroke of the cam-plate upon its needle-bed B the needles will be moved forward, receive the yarn, and then caused to retreat and cast off the loops.

Strictly speaking, there is but one slot in the grooved side of the cam-plate, which is constructed in the form of an obtuse angle, the angle being at or nearly at the point of oscillation of said plate, as I have shown in Fig. 2.

Although what I call a cam-plate is made in one piece, yet the grooves or slots $e$ $e'$ practically divide this plate into three parts—that is, a triangular part or cam, H, with two cams or wings, $H^1$ $H^2$, arranged upon opposite sides of the cam H; and, as these three cams perform different functions and operate differently upon the needles at different times, it will facilitate describing the machine to refer to them as separate parts. Thus the part H, which serves to thrust the needles forward or upward to receive the yarn, always moves them (the needles) to substantially the same point relative to the yarn carrier or guide and the work support, whereas the wings $H^1$ $H^2$, in consequence of their being movable, operate differently upon the needles, which have been temporarily thrown out of action, from what these cams or wings would operate upon the same needles if they (the cams) were rigidly attached to their carrier, as will be hereinafter fully explained.

This plate is pivoted by a stud, $f$, to a sliding plate or cam-carrier, I, which is guided and held in proper position by its rear edge working in a longitudinal groove in the needle-bed, as shown in Fig. 5. Between the cam-plate and the carrying-plate I, and secured rigidly to the former, is an arm, J, to the outer end of which a handle, J′, is applied. The arm J passes out through an oblong slot made through the back of the plate I, the length of which slot will limit the extent of vibration of this arm, but allow the cam-plate to be properly adjusted at every stroke of this plate.

The front edge of the carrying-plate I has a short tongue, $h$, upon it, which is arranged between the embracing portions of the slide $C^1$, as shown in Fig. 1, so as to move this slide and its attachments longitudinally over the needles when the plate I is similarly moved. The front edge of the cam-plate is sloped in two directions from the middle of the length of this plate, as shown at $h^3$ $h^4$ in Fig. 2, so that when the heels $a^1$ of the needles are moved forward out of range of the recesses leading to the slots $e$ $e'$, the needles will all be pressed forward out of operation.

The operation of these cams in knitting a flat net of uniform width, using all of the needles, is substantially as follows: When the cam-plate is moved in the direction indicated by the arrow in Fig. 6, the side $h^2$ of cam H engages with the right-angular shanks $a'$ of the needles and forces them (the needles) forward or up to receive the yarn, and after the point $h^x$ of this cam passes the shanks, the cam $H^2$ engages with the shanks and draws down the needles to form new stitches, the shanks of the needles being left in the position shown at $a$ $a$ $a$ $a$, Fig. 1, the loops or stitches being retained on the hooks of the needles, and the shanks being left on line $y$, Fig. 6. In moving the cam-plate in an opposite direction the needles are actuated in substantially the same manner by the side $h^5$ of cam H and the cam $H^1$.

In knitting-machines hitherto constructed it is usual to draw the heels of the needles back of or below the cams, and cast off the loops when it is desired to cease working any number of them; but by my improved arrangement, when it is desired to cease working a certain number of the needles, the shanks thereof are pushed above or forward of the cam-plate, leaving the work upon the needles, and when it is desired to bring these needles into operation again they are drawn back far enough for the cams to take them, but not far enough to cast off the loops. In Fig. 6 I have illustrated this difference in operation between my machine and those heretofore used.

It will, of course, be understood that when a portion of the needles are moved above or forward of the cams, as at Z, the latches have been opened, and the loops are held upon the central portion of each needle. When it is desired to bring any of these idle needles again into service they are pressed back toward their original working position, say, to the line *x* at Z′, Fig. 6. When, now, the cams engage with the needles, the first effect is to move the needles forward or upward to receive the yarn, and the second effect is to move the needles backward or downward below the work-support to form a new stitch. It is apparent that if, when the cams left the needles on line *y*, Fig. 6, these cams were rigidly attached to the cam-carrier I, each needle which had been out of action would be necessarily moved downward or backward until its shank or heel reached this line *y*, Fig. 6, and, having its latch closed, would cast off its loop, and thereby dropping a stitch on the parts 2 and 4 of cams $H^1$ $H^2$, would always be upon the same line. But in my machine, from the fact that cams $H^1$ $H^2$ are movable, and the parts 2 and 4 are upon different lines in different traverses of the cam-carrier I, the heels *a′* may reenter the grooves *e e′*, and be acted upon by cam H, even if they are not moved back to the line *y*, on which they are left in the ordinary plain working of the machine.

The jacks *b* are applied to a longitudinal work-holding plate, D, which is connected to the frame A by means of slats and pins, or otherwise, so that this plate, together with the jacks, can be adjusted toward and from the forward edge of the needle-bed B. For the purpose of making this adjustment the plate D is suitably attached to the shaft K beneath the needle-bed, which shaft has an eccentric movement imparted to it by turning the crank-handle K′. The work is held by the spurs which are on the edge of the plate D in front of the jacks, as shown in Fig. 1. These spurs prevent the work from rising when the needles are moved forward to receive the yarn. The latch-opener E is a narrow strip of metal secured fast at both both ends, and provided with an adjusting-screw at one end, by which it can be tightened and kept tight. This strip E is inclined toward the jacks, and elevated above the plate D, so as to allow the needles to pass below it. As the hooked ends of the needles pass under the edge of the strip E it will catch under the free ends of the latches on the needles and throw these latches back, so as to allow the yarn to be laid upon the needles in a position to be caught by their hooks.

Upon the upper side, and at or near one end of the cam-carrying plate I, is a ratchet-connecting wheel L, pivoted so that it will not accidentally turn backward, and applied to this wheel is a pointer, *n*, and also a spring-pawl, *p*. (Shown in Fig. 1.) The pawl is suitably attached to the vibrating arm J, on which is the handle J′, by which the machine is operated. Thus it will be seen that at every vibration of the handle J′ the wheel L will be moved a certain distance about its axis, which will be indicated by the hand *n* pointing at certain marks upon the wheel. By means of this wheel the number of vibrations of the cam-plate, and consequently the number of strokes of this plate across the needle-bed, will be registered. The yarn is wound upon a flanged spool, F, which is supported upon a table or other flat surface by means of short legs, as shown in Figs. 3 and 5. The yarn is passed from the circumference of the drum, upon which it is wound, upward and down through the tube *i*, and through the center of the spool to and around a stud, *j*; thence beneath the bottom flange of the spool to the yarn-carrier, as shown in Fig. 5, where it is acted upon by the tension-spring G, as above described.

For the purpose of setting the work upon the needles at the commencement of the operation of knitting, I employ the setting-up device represented in Figs. 4 and 5, which consists of a flat plate terminating at its lower end in a hook or eye for receiving the hook, which is attached to the weight W. The upper edge of the plate S is straight, and from this edge project a number of hooks, *t t*, which are arranged at suitable distances apart with reference to the distance apart of the needles *a*. The bent ends of these hooks are arranged in the direction of the length of the plate to which the hooks are secured, and said ends are so bent as to allow the needles to pass through them when arranged in proper position in front of the jacks.

My setting-up device occupies less space between the jack and work-holder than others known to me, because the hooks turn parallel with the plate, and are not liable to catch on the work-holder, and seldom, if ever, fail to take all the loops; whereas the devices heretofore used are liable to catch and cast off loops, especially with an inexperienced hand; and, besides this, the number of hooks required is greater than in my setting-up device.

The operation is as follows: The yarn is wound upon the spool F as evenly as possible, but not too tight. The end of the yarn is passed through the center of the spool and carried off to the yarn-carrier, to which it is applied, as clearly shown in Fig. 5. The operator seats himself near the machine, which should be clamped to a table, as described and shown, with his left side to the table and at the left end of the machine. The cam-carriage is now moved to the right-hand end of the machine, and the end of the yarn passed through the yarn-carrier and drawn down below the work-holding plate D through this plate. The hooked setting-up device is held in the left hand and its hooks passed up in front of the jacks, the tops of the hooks being even with the tops of the jacks, and resting against them so that the needles can pass through them. With the right hand the cam-carriage is moved across the needle-bed to the left-hand side of the machine, thus causing the needles to move up, take the yarn, and return to their former positions. The set-up device is then drawn down so that the hooks will be beneath the plate D and held by the weight W, which will hold the work down.

Having described my invention, what I claim as new, and desire to secure by Letters Patent, is—

1. Mechanism, substantially as described, for allowing the cam-plate by which the needles are moved to have an oscillating motion, substantially as described.

2. Mechanism, substantially as described, for the adjustment of the needles in front of the cam-plate H, when it is desired to throw some or all of the needles out of action, substantially as described.

3. In a knitting-machine, the combination, with a grooved needle-support and a cam-carrier, having an unobstructed space between the actuating cams and the work-support, of a triangular cam and two movable cams arranged one upon each side of the triangular cam, whereby the needles which have been out of action and retain their loops may be again brought into action without casting off their loop, substantially as set forth.

4. The attachment of the arm J or its equivalent directly to an oscillating cam-plate, H, which is provided with a pivot, *f*, about which it moves, substantially as described.

5. The combination of an adjustable work-holder, D, and an adjustable jack, substantially as described.

6. The spool or yarn holder F, with the tube I or equivalent thereof, constructed to operate substantially as described.

7. The bow-spring G, applied to the reciprocating perforated arm $C^2$ in such manner as to lift the yarn between the two passages *c d* on its way from the spool to the work, said spring being so constructed as to keep an even tension upon the yarn with little or no friction, substantially as described.

8. A setting-up device, S *t*, constructed with its hooks *t* all arranged in the direction of the length of the plate S, as shown and described.

THOMAS CRANE.

Witnesses:
GEO. W. BURCHARD,
S. S. BALL.